United States Patent
Wilkins

[11] Patent Number: 5,960,582
[45] Date of Patent: Oct. 5, 1999

[54] SPINNING BAIT CONTAINER

[76] Inventor: John A. Wilkins, 2705 N. 14th St., Broken Arrow, Okla. 74012

[21] Appl. No.: 08/950,089

[22] Filed: Oct. 14, 1997

[51] Int. Cl.[6] ..................................................... A01K 97/06
[52] U.S. Cl. ....................................... 43/54.1; 206/315.11
[58] Field of Search .................................... 43/54.1, 57.1; 224/920; 206/315.11, 308.1, 387.1

[56] References Cited

U.S. PATENT DOCUMENTS

| | | | |
|---|---|---|---|
| 899,466 | 9/1908 | O'Leary | 43/57.1 |
| 1,574,416 | 2/1926 | Campbell | 43/54.1 |
| 1,954,127 | 4/1934 | Harsted | 43/57.1 |
| 2,513,538 | 7/1950 | Williams | 224/241 |
| 2,533,865 | 12/1950 | Wynne, Sr. et al. | 43/57.1 |
| 2,707,583 | 5/1955 | Keilholz | 224/237 |
| 2,723,484 | 11/1955 | Nelson, Jr. | 43/57.1 |
| 3,336,693 | 8/1967 | Lussier | 43/54.1 |
| 3,532,211 | 10/1970 | Gellert | 206/387.1 |
| 3,587,841 | 6/1971 | Devejian | 206/387.1 |
| 3,620,361 | 11/1971 | Fugiwara | 206/387.1 |
| 3,797,161 | 3/1974 | Smallwood | 43/57.1 |
| 4,245,422 | 1/1981 | Souza | 43/57.1 |
| 4,389,806 | 6/1983 | Herring | 43/57.1 |
| 4,452,003 | 6/1984 | Deutsch et al. | 43/57.1 |
| 4,681,220 | 7/1987 | Beneke | 206/315.11 |
| 4,827,658 | 5/1989 | Wolniak | 43/54.1 |
| 4,848,585 | 7/1989 | Snyder | 206/315.11 |
| 4,863,025 | 9/1989 | Wolf | 206/387.1 |
| 4,927,016 | 5/1990 | Fuller | 206/315.11 |
| 5,123,197 | 6/1992 | Gentry et al. | 43/54.1 |
| 5,263,580 | 11/1993 | Ciba et al. | 206/308.1 |
| 5,454,185 | 10/1995 | Love | 43/57.1 |
| 5,533,297 | 7/1996 | Crosby | 43/57.1 |
| 5,653,335 | 8/1997 | Bauer et al. | 206/308.1 |

OTHER PUBLICATIONS

Mustad A Fishing Tip From Mustad, Bassin' Magazine, approx. Mar. 1997.
Anon. Ad from Bassmaster Magazine for "Dart Soft Tackle Kits", 1997.
Anon. Product label from Flambeau® "Spinnerbait Box," purchased 1997.
Anon. Hydro Lures web page (http://www.cybernet.net/~goodtogo/fishing.html).
Peck Angler's Secret weapon web page (http://www.bossnet.com/995/peck908.html).
Tucker Spinner Baits Year–Round, Bassmaster, Jan. 1996 (web version, http://www.outdoors.net/bass/stojan96.htm).

*Primary Examiner*—Michael J. Carone
*Assistant Examiner*—Darren Ark
*Attorney, Agent, or Firm*—Fellers, Snider, Blankenship, Bailey & Tippens, P.C.

[57] ABSTRACT

The present invention relates generally a device for storing fishing lures such as spinning baits, or spinner baits as they are also known in the art. In more particular, the present invention is directed toward an improved spinning bait storage container wherein the unique configuration of this sort of lure is accommodated by a specially designed individual storage container which prevents the lure from becoming entangled with other lures. The instant invention consists of a generally rectangular box within which are erected barriers that support and restrain the lure when it is placed therein. This arrangements prevents the lure from becoming entangled with other lures, reduces compressive stress on the skirt, and reduces the risk of injury to the fisherman due to exposed fishhooks.

9 Claims, 2 Drawing Sheets

SPINNING BAIT CONTAINER

I. BACKGROUND OF THE INVENTION

A. Field of the Invention

The present invention relates generally a device for storing fishing lures such as spinning baits, or spinner baits as they are also known in the art. In more particular, the present invention is directed toward an improved spinning bait storage container wherein the unique configuration of this type of lure is accommodated by means of a specially designed individual storage container.

B. Description of the Prior Art

Broadly speaking, a spinning bait is a fishing lure which is constructed of two arms of roughly equal length which are jointed together in an "V" or elbow configuration. At or near the free end of one of these two arms is a collection of one or more objects—typically shiny metallic spoon-shaped objects called "blades"—which are designed to spin as the lure is drawn through the water. Hence, this arm is often referred to as the spinner arm. The other arm of a spinning bait is equipped with a hook which is typically concealed within a skirt formed of numerous strands of some flexible material. This material might be, by way of example only, strands of metal flake-impregnated silicon. The skirt is usually surmounted by (and attached to) a bullet shaped head, upon which are affixed small "eyes" to make this arm of the lure resemble a small fish or other aquatic prey. The head and the skirt can be (and are) both variously colored to enhance their attractiveness to fish.

In normal operation, a fishing line is tied to the spinning bait at or near the apex of its "V." The device is then cast into the water using a conventional rod and reel combination and is thereafter drawn back toward the caster. When it is drawn through the water, the blades attached to the spinner arm beat the water, thereby generating vibrations which draw the attention of a target fish, often a bass, to the device. In a best case scenario, the fish, after turning its attention to the vibrating members of the spinning bait, mistakes the lure on the non-spinning arm as prey and attempts to consume it, thereby impaling itself on the hook. Ingenious lure manufacturers have discovered that by varying the relative lengths of the two arms, and the number and characteristics of the items attached thereto, it is possible to intensify the generated vibrations, thereby augmenting the effectiveness of the device.

The peculiar construction of spinning baits has made their storage somewhat problematic both from a safety standpoint and from an aesthetic standpoint. First, because of the their larger size and "V" shape, these lures do not fit comfortably into the standard rectangular compartments of most fishing tackle boxes. Thus, they may be relegated to a "common area" of some sort within the box. When these lures are placed in contact with other lures (either of the same type or not) there is a high potential for entanglement of the skirt, hook, and or blades with similar items of the other lures. Untangling these lures represents a serious safety problem, with impalement of the untangler by a hook a constant threat. Additionally, the skirts of these lures are prone to softening and partial melting at summer temperatures, which can result in adhesion between skirts of different lures if they are placed together. Similarly, if these lures are laid down in a conventional manner within a hot tackle box, heat and gravity will tend to flatten the skirt and cause its individual strands to adhere together, thereby reducing the aesthetic appeal of the lure and its effectiveness in the water.

Heretofore, as is well known in the fishing industry, there has been a need for a device that would enclose a spinning bait and prevent it from making contact with the other lures in a tackle box. Additionally, the device should support the lure in such a fashion that its skirt would remain relatively uncompressed. Finally, the device should provide ready access to the lure when it is opened.

Accordingly, it should now be recognized, as was recognized by the present inventor, that there exists, and has existed for some time, a very real need for a spinning lure storage device that would address and solve the above-described problems.

After the present invention was conceived and constructed, a patent search was conducted in the United States Patent and Trademark Office for the purpose of determining whether any similar or related solutions had been previously developed to the foregoing problems. That patent search produced the following references relating to fishing lure storage devices:

| Patent No. | Inventor | Title | Issue Date |
| --- | --- | --- | --- |
| 1,574,416 | Campbell | Carrier or Holder for Artificial Bait | Feb. 23, 1926 |
| 2,513,538 | Williams | Carrier for Bait-Casting Plugs and Lures | July 4, 1950 |
| 2,707,583 | Keilholz | Lure Dispenser | May 3, 1955 |
| 2,723,484 | Nelson, Jr. | Packaging and Display Containers for Fish Lures | Nov. 15, 1955 |
| 3,336,693 | Lussier | Angler's Jig Box | Aug. 22, 1967 |
| 4,681,220 | Beneke | Container for an Offshore Fishing Lure | Jul. 21, 1987 |
| 4,827,658 | Wolniak | Fishing Tackle Box with Vertical Storage Compartments | May 9, 1989 |
| 5,533,297 | Crosby | Fishing Lure Container | Jul. 9, 1996 |

Campbell Pat. No. 1,574,416 discloses a holder for artificial lures which is designed to be worn on the belt of the fisherman, but which does not provide any means of restricting the movement of the lure within the holder, other than through contact with the surrounding walls. Williams Pat. No. 2,513,538 is directed toward a carrier for fishing lures rather than an individual lure container. Keilholz Pat. No. 2,707,583 discusses a tubular lure dispenser of transparent material that can be opened at both ends: the top opening for depositing a lure therein, and the bottom opening for extracting a lure therefrom. This arrangement would not provide any hanging support for the lure and, in the case of a spinning bait, its skirt would be compressed at the bottom of the dispenser during storage. Nelson Jr. Pat. No. 2,723,484 advises of a packaging and display container for a conventional fishing lure with an elongated body and hooks protruding from the underneath side. This invention does not address the peculiar storage problem the arises with a spinning lure. Lussier Pat. No. 3,336,693 discloses a tackle box with movable panels that may be raised to reveal the lures hanging thereon. Wolniak Pat. No. 4,827,658 is directed toward a fishing tackle box that is equipped with a plurality of vertical tubes, wherein individual artificial fishing lures might be stored. Finally, Beneke Pat. No. 4,681, 220 and Crosby Pat. No. 5,533,297 also discuss cylindrically shaped containers for fishing lures, with provision to accommodate an attached leader. In each case, however, there is no internal structure within the device to restrict the movement of the lure during transportation and, if the leader is too long, the skirt of a spinning lure stored therein would be compressed at the bottom of the container.

Others have specifically addressed the storage of spinning lures. For example, the Dart company manufactures a soft "Spinner Bait File" which is designed to accommodate spinning lures which have been placed into individual plastic bags for storage. An obvious disadvantage of this approach is that a thin plastic bag may be readily punctured by the spinning lure hook, thereby exposing the unsuspecting fisherman to the possibility of an injury. Additionally, this approach, though inexpensive, does not protect the skirt of the lure against compression during storage. Others have suggested that a soft CD carrier might be utilized, each spinning bait being placed in a separate compartment wherein a standard CD jewel box would normally be placed. This sort of storage container will result in compression of the skirt and may pose a safety hazard if the lure is placed into the storage compartment upside down. Finally, Flambeau Products Corporation (among others) manufactures a "Spinnerbait Box," which is a box-like carrier that features rows of internal vertical partitions over which several spinning baits may be hung in a side-by-side arrangement. However, lures carried inside this sort of carrier will tend to become entangled if the box is upended, as the spinning baits are free to swing about their point of suspension and have sufficient freedom of movement to allow them to collide with adjacent lures.

As is illustrated by the discussion of the previous paragraph, the attempt to develop devices for the storage of fishing lures is an ongoing enterprise. However, no prior device provides the benefits attendant to the instant invention. Additionally, the prior art does not suggest the present inventive combination of component elements arranged and configured as disclosed and claimed hereinafter.

Before proceeding to the description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

II. SUMMARY OF THE INVENTION

The instant invention provides a means for storage of a spinning lure, wherein the lure may be kept isolated from other components in the tackle box and suspended within in a manner that is designed to accommodate and preserve its unique structure. Additionally, the instant invention holds the lure securely in place when closed while simultaneously providing the fisherman ready access to the it.

According to a first aspect of the present invention, there is provided a carrier for a spinning bait which is generally formed in the shape of a rectangular prism (i.e., is preferably box-like in shape). The spinning bait container comprises an enclosure formed of a rigid impact-resistant waterproof material such as plastic. The face of the device preferably has dimensions commensurate with the lateral dimensions (height and width) of a spinner bait, while the thickness of the container is sufficient to accommodate the thickness of the same lure without unduly compressing the skirt. These dimensions will generally result in a container that is taller and wider than it is thick. In the preferred embodiment, the face of the container is hinged to serve as a lid or opening and is provided with means for securing the lid to the container when it is in the closed position. This allows the fisherman ready access to the lure when the device is opened. The rear surface is preferably sized to match that of the face and has erected thereon a hook or other protrusion which acts as a hanger, from which the spinner bait is suspended when it is stored within.

When this device is used in its intended fashion, the lure is hung within the carrier with the apex of the now inverted elbow engaging the hanger. Additionally, the lure is securely maintained within the device and prevented from excessive movement by the addition of two internal barriers or walls that are configured to be roughly parallel to and above the arms of the spinner bait when it is hanging in its normal position. Thus, in its preferred orientation, the spinner lure will be suspended within the closed device by the hanger and kept from swaying therein by the restraining presence of the internal barriers.

According to a second aspect of the present invention, there is provided a carrier substantially as described above, but wherein the hanger has been eliminated and the spinning bait is maintained in its position by relocating the barriers to be beneath the arms of the spinning lure. In this configuration, the barriers perform the dual roles of supporting the spinning bait above the floor of the container—thereby reducing the likelihood of skirt compression—and restricting the movement of the lure within the container, the lure being trapped between the barriers below and the walls of the carrier.

According to a third aspect of the present invention, there has been provided a device substantially as described above for the second embodiment, but wherein the upper extent of the two barriers are extended to form a single arcuate surface, i.e., the two barriers are joined together at their tops to form an apex. In operation, the elbow of the spinner bait would be rested atop the apex of the arcuate barrier face, and the arms of the spinner would simultaneously be restrained and supported by the action of the barriers.

Finally, those skilled in the art will recognize that, although the foregoing embodiments are described in terms of the use of a wall or other barrier to restrain the movement of the spinning lure, strategically placed knobs or protrusions could be used as well. In more particular, since the purpose of the walls is to restrain the movement of the lure with in the container, accurately positioned posts could accomplish the same purpose.

Although the language herein has been couched in terms of a spinning lure, those skilled in the art will recognize that the invention and embodiments disclosed herein might be used with other fishing lures which are similarly configured. Thus, when the term "spinning lure" is used hereinafter, it will be understood to apply to a similarly formed and configured lure, irrespective of how that lure might actually be denominated by its manufacturer or the public.

III. BRIEF DESCRIPTION OF THE DRAWINGS

IV. DETAILED DESCRIPTION OF THE PREFERRED EMBODIMENTS

Figure 1:
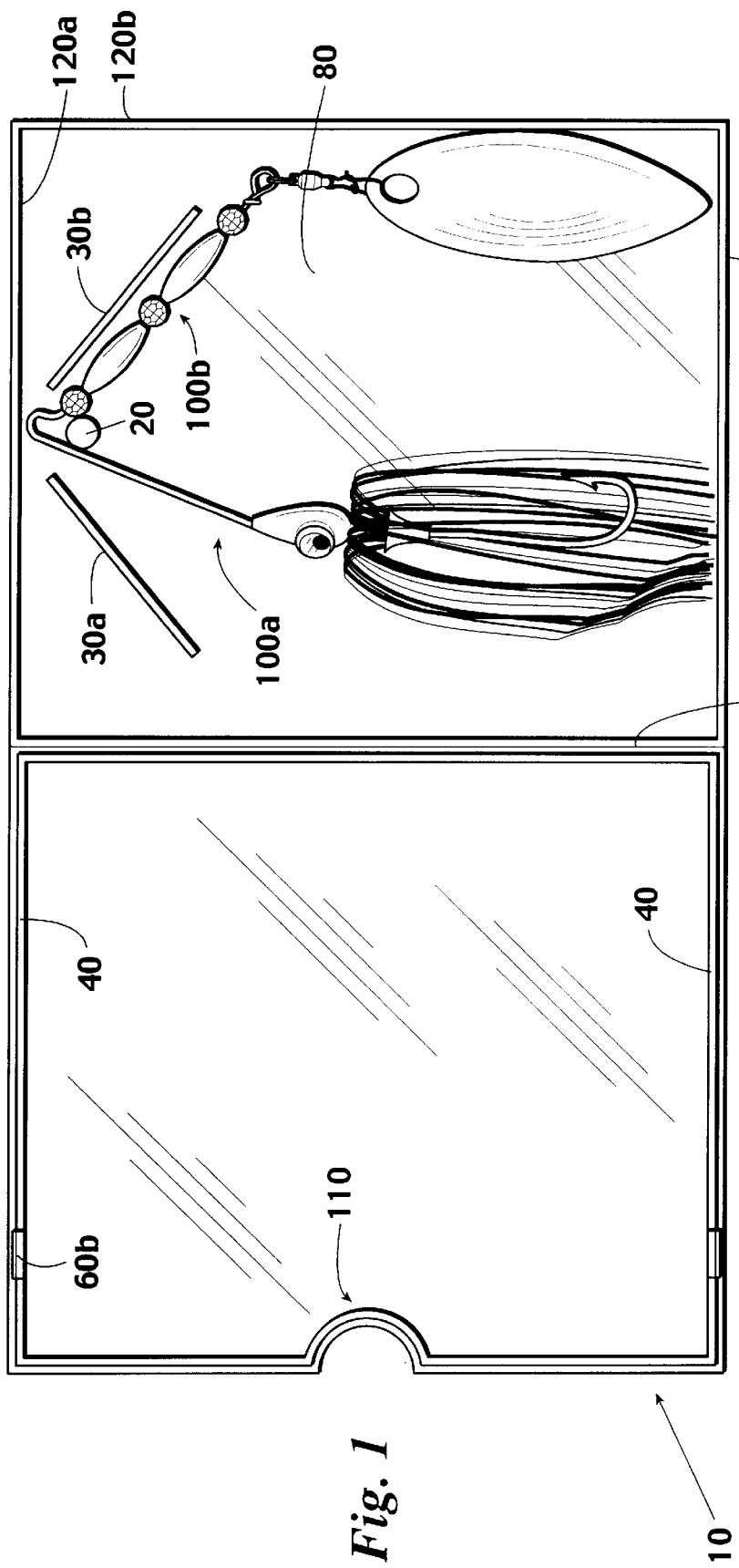
FIG. 1 is a plan view of the essential elements of a preferred embodiment of the instant invention, where both a hanger and restraining barriers have been utilized.

Referring to the drawings in detail, wherein like numerals denote identical elements throughout the several views, there is shown in FIG. 1 a schematic representation of a preferred embodiment of the present invention, wherein a spinning lure is depicted as being suspended within the instant device. The spinning lure has two arms (100a and 100b) which meet at an elbow 90 at some predetermined angle. Attached to vertical rear wall 80, is a hanger 20, which has been designed to engage the spinning lure at its "V" elbow 90 and to provide support for it when the device 10 is stored in an upright position, as is generally illustrated in FIG. 1. Additionally, restraining barriers 30a and 30b are positioned so as to restrain the arms of the spinning lure between them, thereby tending to restrict the lure's range of motion when the container is moved. The restraining barriers (30a and 30b) are pictured in the various figures as being linear partitions or walls with flat faces that are roughly parallel to the arms to the spinner lure when the lure is hung from hanger 20. This is certainly the preferred arrangement. However, those skilled in the art will recognize that the barriers might take a variety of shapes, provided that they perform the essential function of restraining the lateral movement of the spinning bait within the device.

Preferably, both hanger 20 and restraining barriers 30a and 30b are extended outward a sufficient distance from the vertical rear wall 80 (i.e., in a direction orthogonal to the plane defined by rear wall 80) to place their respective termini proximate to cover 40 when the cover 40 is closed. This arrangement prevents the arms of the lure from "jumping over" a barrier when the container is jostled during transportation and use. Note that the interior angle that would be formed between restraining barriers 30a and 30b—if they were extended lengthwise to a point of intersection—is somewhat greater than that of the interior angle between the arms of the spinner bait 30a and 30b. The instant inventor contemplates that this inter-barrier angle might be adjusted by modifying the relative slopes of these two barriers, thereby accommodating spinning lures that have arms which meet different angles.

Figure 2:
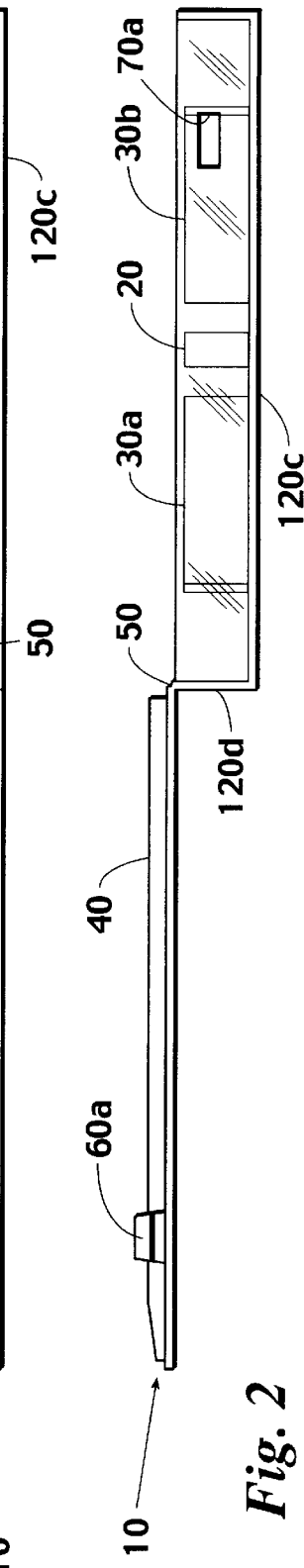
FIG. 2 is a side view of the instant invention.
Figure 3:
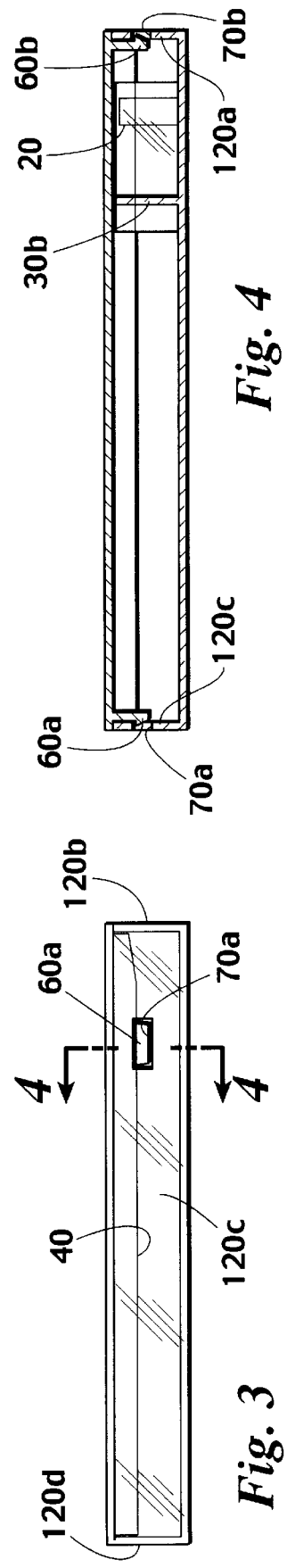
FIG. 3 is a side view which illustrates the instant embodiment in a closed position.
Figure 4:
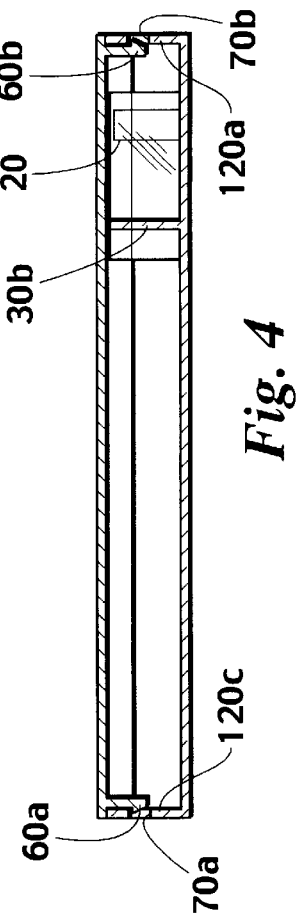
FIG. 4 is a cross sectional view taken along the line 4—4 in FIG. 3, wherein the operation of the lid latch is illustrated.

FIG. 2 is a side view of the above embodiment, wherein a preferred means for fastening cover 40 in a closed position is illustrated. Cover 40 is pictured throughout the figures as being attached via hinge 50 to the device 10, although those skilled in the art will recognize that other arrangements are certainly possible. In FIG. 2, left side clip 60a is positioned so as to mate with aperture 70a when the lid is closed (FIG. 3). As is more clearly illustrated in FIG. 4, each side clip (60a and 60b) is equipped with a hook-like terminus that catches the upper extremity of the corresponding aperture (70a and 70b, respectively) when the cover 40 is moved to the "closed" position. The clips 60a and 60b are kept in place by friction and may be easily disengaged to permit entry into the container 10. Circular cut-away 110 in cover 40 provides a means for the fisherman to gain leverage on the closed cover 40 by hooking a finger therein and then pulling.

In practice, the instant invention would preferably be utilized as follows. A fisherman would be expected to keep each spinning bait in a separate container, thereby reducing the risk of tangling and injury. Because of the dimensions of this device,—i.e., because in its preferred embodiment it is relative thin in comparison with its height and width—a number of them may be stood side-by-side in a tackle box. It is the inventor's expectation that paper labels, upon which will be written a description of the lure contained therein, will be attached to the top of the device to assist the fisherman in withdrawing the desired lure from among those in storage. If the container is stored in an upright position—as the instant inventor intends and as is illustrated in FIG. 1—the spinning bait is suspended above the floor (i.e., sidewall 120c) of the device and the skirt which adorns the terminus of arm 100a is not compressed, thereby preserving its shape for subsequent use in fishing.

Figure 5:
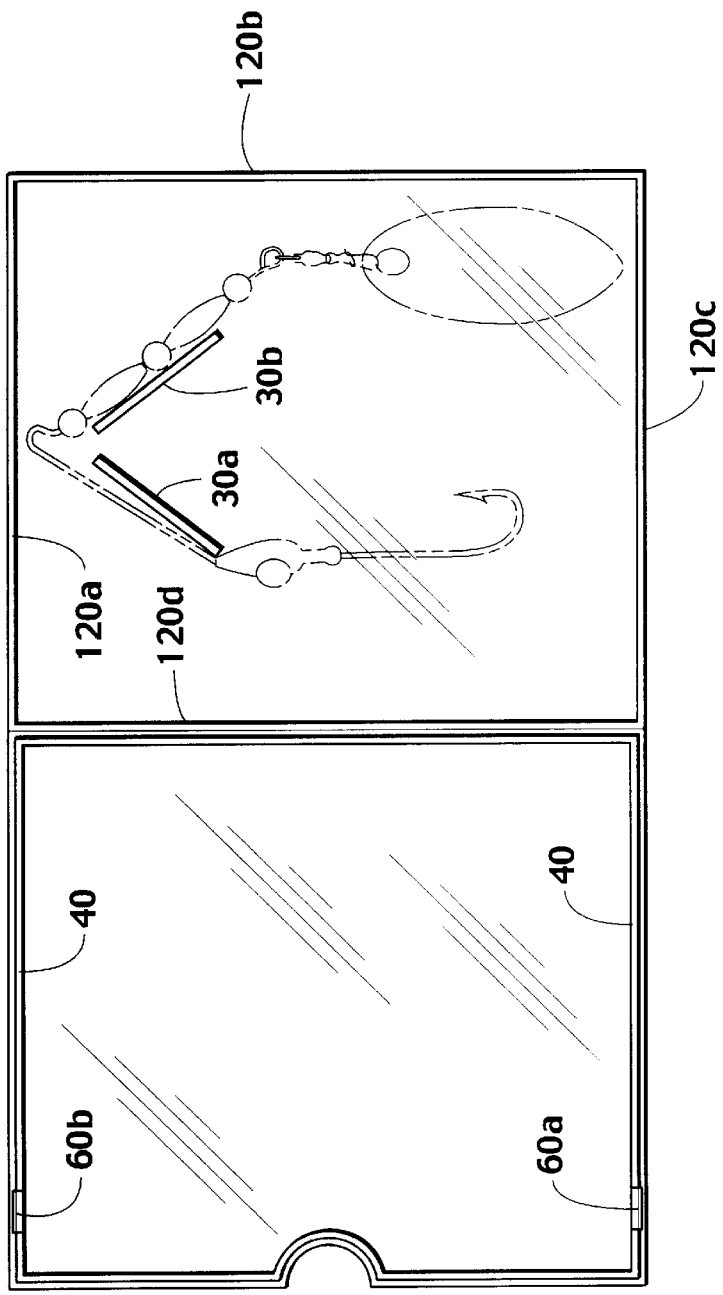
FIG. 5 is a plan view of another embodiment of the instant invention, wherein the hanger has been eliminated.

According to a second aspect of the present invention, there is shown in FIG. 5 a schematic representation of another preferred embodiment, wherein the need for the hanger has been eliminated. In more particular, in this embodiment left and right barriers 30a and 30b are lowered with respect to the top of vertical rear wall 80 and moved closer together, thereby allowing a spinning lure to be suspended atop of these two elements. Additionally, the interior angle between the two barriers has been reduced relative to the previous embodiment so that it is now less than the interior angle between the two arms (30a and 30b) of the spinning bait. In use, the two barriers support the lure from below, while the container sidewalls 120a, 120b, and 120d restrain its movement within the container. Once again, it is preferable that left 30a and right 30b barriers be nearly as tall a sidewall, so that the vertex of the spinning bait will remain trapped above the barriers.

Those skilled in the art will recognize that, although the invention described herein has been pictured exclusively as having a box-like shape, many other shapes are possible and, indeed, have been contemplated by the inventor. Additionally, although the figures have illustrated the instant invention as having two restraining walls or barriers of approximately equal length, it should be clear to those skilled in the art that the relative lengths of the two restraining walls might be varied to more effectively accommodate lures of different dimensions. Similarly, the restraining walls or barriers, although they have been illustrated as being separate linear entities, might be made curved and/or joined into single solid triangular (or other) shape which presents a face to each arm of the spinning bait. Finally, although the cover 40 of the invention disclosed herein has been pictured and discussed in the various embodiments as being hingedly attached to the container, in fact those skilled in the art recognize that there are many other means whereby the cover 40 might be made to open and close, including by way of removal of the entire cover.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A device for the storage and transportation of a spinning bait, wherein the spinning bait having predetermined horizontal and vertical dimensions, and the spinning bait having a left arm and a right arm meeting at an elbow, said device comprising:

(a) a container formed of a rigid impact-resistant waterproof material, said container having a vertical rear wall, said rear wall, (1) having an inner face,
(2) having a left side and a right side,
(3) having an upper edge, and
(4) being sized to accommodate the horizontal and vertical dimensions of the spinning bait;

(b) a hanger for supporting the spinning bait at said elbow, said hanger being attached to said inner face of said rear wall proximate to the upper edge thereof, wherein said hanger has an upper surface and wherein said elbow is generally free to move along said upper surface when the spinning bait is supported thereon;

(c) a left restraining barrier having an upper edge and a lower edge, said lower edge being attached to said inner face of said rear wall, said left restraining barrier being located
  (1) between said vertical rear wall left side and said hanger,
  (2) below said vertical rear wall upper edge, and
  (3) above and proximate to the spinning bait left arm when the spinning bait is supported on said hanger;

(d) a right restraining barrier having an upper edge and a lower edge, said lower edge being attached to said inner face of said rear wall, said right restraining barrier being located
  (1) between said vertical rear wall right side and said hanger,
  (2) below said vertical rear wall upper edge, and
  (3) above and proximate to the spinning bait right arm when the spinning bait is supported on said hanger;

(e) a cover attached to said container, said cover capable of both being opened to allow access to the spinning bait and being closed to deny access thereto, said cover having an inner surface,
  said cover inner surface being proximate to said upper edges of said left and right restraining barriers when said cover is placed in a closed position; and, (f) means for maintaining said cover in the closed position.

2. A device according to claim 1 wherein said left and right restraining barriers are of substantially equal lengths.

3. A device according to claim 1 wherein said cover is hingedly attached to said container.

4. A device according to claim 1 wherein said cover is removably attached to said container.

5. A device according to claim 4 wherein said cover comprises a vertical front wall of said container.

6. A device according to claim 5 wherein said cover has a horizontal dimension and a vertical dimension commensurate with said vertical rear wall size.

7. A device according to claim 1 wherein said left and right restraining barriers are linear partitions with flat faces.

8. A device according to claim 7 wherein said left and right restraining barriers are roughly parallel to the spinning bait left and right arms respectively when the spinning bait is supported on said hanger.

9. A device for the storage and transportation of a spinning bait, wherein the spinning bait having predetermined horizontal and vertical dimensions, and the spinning bait having a left arm and a right arm meeting at an elbow, said device comprising:

(a) a container formed of a rigid impact-resistant waterproof material, said container having a vertical rear wall, said rear wall,
  (1) having an inner face,
  (2) having a left side and a right side,
  (3) having an upper edge, and
  (4) being sized to accommodate the horizontal and vertical dimensions of the spinning bait;

(b) a hanger for supporting the spinning bait at said elbow, said hanger being attached to said inner face of said rear wall proximate to the upper edge thereof, wherein said hanger has an upper surface and wherein said elbow is generally free to move along said upper surface when the spinning bait is supported thereon;

(c) a left restraining barrier, said left restraining barrier, being a linear partition with a flat face, and,
  having an upper edge and a lower edge, said lower edge being attached to said inner face of said rear wall, said left restraining barrier being located
    (1) between said vertical rear wall left side and said hanger,
    (2) below said vertical rear wall upper edge, and
    (3) above and proximate to the spinning bait left arm when the spinning bait is supported on said hanger;

(d) a right restraining barrier, said right restraining barrier being a linear partition with a flat face, and,
  having an upper edge and a lower edge, said lower edge being attached to said inner face of said rear wall, said right restraining barrier being located
    (1) between said vertical rear wall right side and said hanger,
    (2) below said vertical rear wall upper edge, and
    (3) above and proximate to the spinning bait right arm when the spinning bait is supported on said hanger;

(e) a cover attached to said container, said cover capable of both being opened to allow access to the spinning bait and being closed to deny access thereto, said cover having an inner surface,
  said cover inner surface being proximate to said upper edges of said left and right restraining barriers when said cover is placed in a closed position; and, (f) means for maintaining said cover in the closed position.

* * * * *